US005483677A

United States Patent [19]

Brydon et al.

[11] Patent Number: 5,483,677

[45] Date of Patent: Jan. 9, 1996

[54] RADIO SYSTEM WITH MEASUREMENT AND ADJUSTMENT OF TRANSFER DELAY

[75] Inventors: Alastair N. Brydon; Anthony C. Yarwood, both of Suffolk, England

[73] Assignee: British Telecommunications public limited company, London, United Kingdom

[21] Appl. No.: 142,399

[22] PCT Filed: May 22, 1992

[86] PCT No.: PCT/GB92/00935

§ 371 Date: Dec. 22, 1993

§ 102(e) Date: Dec. 22, 1993

[87] PCT Pub. No.: WO92/21184

PCT Pub. Date: Nov. 26, 1992

[30] Foreign Application Priority Data

May 24, 1991 [GB] United Kingdom .................. 9111313

[51] Int. Cl.[6] .................................................. H04B 7/00

[52] U.S. Cl. ....................... 455/67.6; 455/51.2; 455/67.4; 375/356

[58] Field of Search ....................... 455/67.1, 67.3–67.6, 455/51.2, 51.1; 375/109, 107, 356, 358

[56] References Cited

U.S. PATENT DOCUMENTS

| | | | |
|---|---|---|---|
| 4,696,051 | 9/1987 | Breeden | 455/51.2 |
| 4,696,052 | 9/1987 | Breeden | 455/51.2 |
| 5,014,344 | 5/1991 | Goldberg | 455/51.2 |
| 5,070,537 | 12/1991 | Ohira et al. | 455/67.3 |
| 5,077,759 | 12/1991 | Nakahara | 455/67.6 |

OTHER PUBLICATIONS

Hiyama et al., "Digital Radio Concentrator System" (DRCS), 298 N.E.C. Research and Development (1985) Jan., No. 76, Tokyo, Japan, pp. 24–35.

*Primary Examiner*—Reinhard J. Eisenzopf
*Assistant Examiner*—Thanh Le
*Attorney, Agent, or Firm*—Nixon & Vanderhye

[57] ABSTRACT

A radio system has a control center for providing signals for transmission to a plurality of radio transmitters, each connected to the central source by a digital data link. A delay equalizer measures the variable transfer delay of each data link and adjusts the transfer delay of the transfer links to equalize the transfer delays to transmitters, so that the signals from the control can be transmitted from the transmitters substantially in time synchronism.

12 Claims, 3 Drawing Sheets

RADIO SYSTEM WITH MEASUREMENT AND ADJUSTMENT OF TRANSFER DELAY

BACKGROUND OF THE INVENTION

1. Field of the Invention

The present invention relates to a radio system, and in particular, though not exclusively, to a quasi-synchronous radio system.

2. Related Art

A simplified example of a quasi-synchronous, bi-directional radio system is shown schematically in FIG. 1, where a control centre 1 is connected by fixed inks (A, B, C, D) to transceiver (sometimes referred to as transmitter) sites 2, 3, 4, 5. The system of this example is bi-directional permitting two way communication between a mobile 6 and the control centre 1 via the transceivers.

In a quasi-synchronous system transmitter (transceiver) sites all radiate the same signal on nominally the same radio channel. Such systems are suitable for wide area coverage over a limited number of radio channels, sometimes only a single channel, and so are often adopted by police, fire and similar utility services. Geographical considerations and transmitter power restrictions, for example, often mean that it is not possible to achieve coverage of the area served by such services with a single transmitter site, so the multiple transmitter site configuration of a quasi-synchronous or synchronous radio system is appropriate.

In a quasi -synchronous system the radio frequency carriers are within a few Hertz of each other, while the modulation imposed on the carrier remains synchronous. This is necessary because in regions where the coverage of two neighbouring transmitters overlap, a mobile will receive signals from both transmitters. In such circumstances the two signals must be sufficiently synchronous not to destructively interfere. In a synchronous radio system where the signals radiated from all transmitters are identical in all respects and in particular are transmitted on the same frequency, the same circumstances may occur.

In a quasi-synchronous radio system the necessary accuracy of radio carrier frequency can be provided by using accurate ovened oscillators at the transmitters. The synchronisation of the modulated signals between neighbouring transmitters requires, typically, an accuracy of:

AM systems: maximum amplitude differential 3 dB maximum phase differential 30° or 0.018f° whichever is greater (worst case 50 microseconds)

FM systems: maximum amplitude differential 2 dB maximum phase differential 10° or 0.007 f° whichever is greater (worst case 20 microseconds)

To achieve this degree of matching it is necessary that the amplitude and phase transfer functions of fixed links between the control centre and its transmitters differ by no more than these limits across the audio band (300 Hz–3400 Hz). One solution to this problem is to use fixed radio links between the control centre and the transmitters at either VHF or microwave frequencies. These introduce constant delay and can be equalised relatively easily for any differences in their path lengths. Analogue land lines have also been used, but equalisation becomes more of a problem and performance can be poor.

It would be advantageous to be able to use a digital data network to provide the links, for example the Megastream (registered trade mark) service offered by British Telecom which provides customers with 2.048 Mb/s digital paths between pairs of sites. Other examples of digital data networks which could be used are Kilostream (registered trade mark) and ISDN (Integrated Services Digital Network). By connecting appropriate multiplexers at each end, the digital bearer can be used to carry a variety of traffic, including digital coded audio signals. In general with such digital data networks the connection is not direct, but is provided through a trunk network, with customer access being via a local exchange. A characteristic of such networks is that traffic can reach its destination via more than one route, and the network has the ability to re-route traffic to accommodate equipment failures, traffic fluctuations, etc.

This dynamic re-routing facility is such that there is an uncertainty in the propagation delay which will be experienced by a signal travelling between two network terminations. The variation can be of the order of milliseconds which therefore, apparently, rules out any possibility of using such networks to support quasi-synchronous radio directly.

BRIEF SUMMARY OF THE INVENTION

According to a first aspect the invention provides a radio system comprising: a central source of signals for transmission; a plurality of radio transmitters, each connected to the central source by a digital data transfer link each having a respective transfer delay; means for injecting into a channel of a transfer link a test signal at intended predetermined times, means for determining the travel time of the test signal over a link by establishing the difference between arrival time and the intended predetermined time of transmission, and means for adjusting the transfer delay to at least one of the transmitters to equalise the transfer delays to the transmitters, so that signals from the central source can be transmitted from the transmitters substantially in time synchronism, characterised in that there is correction means for measuring a transmit delay between the intended predetermined transmission time and the actual time of transmission of the test signal, and for sending the length of the transmit delay over the transfer link, so that the adjustment of transfer delay can be corrected to take account of the transmit delay.

BRIEF DESCRIPTION OF THE DRAWINGS

Preferred embodiments of the invention will now be described by way of example and with reference to the accompanying drawings wherein.

DETAILED DESCRIPTION OF EXEMPLARY EMBODIMENTS

Figure 1:
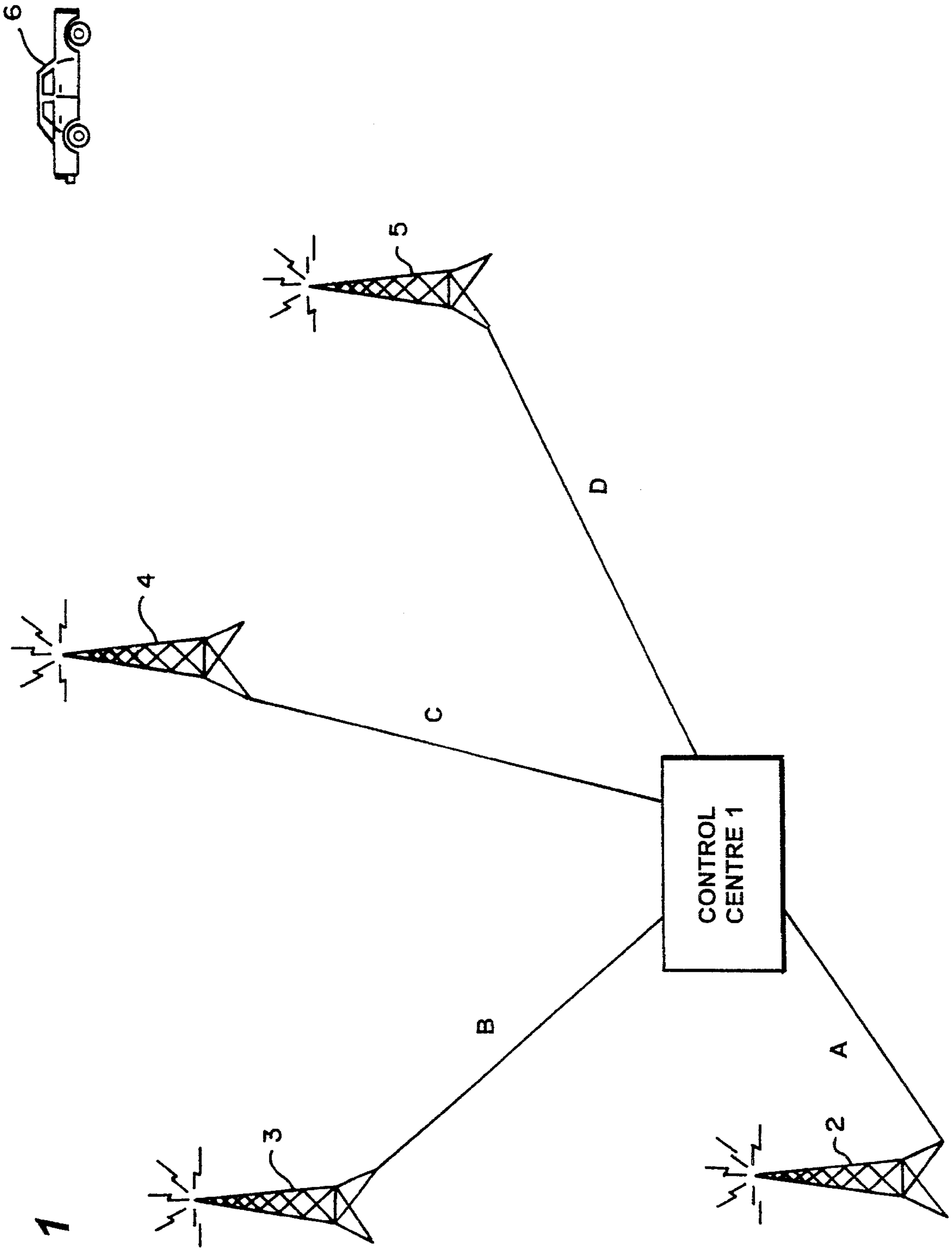
FIG. 1 is a general schematic diagram of a simplified example of a quasi-synchronous radio system.
Figure 2:
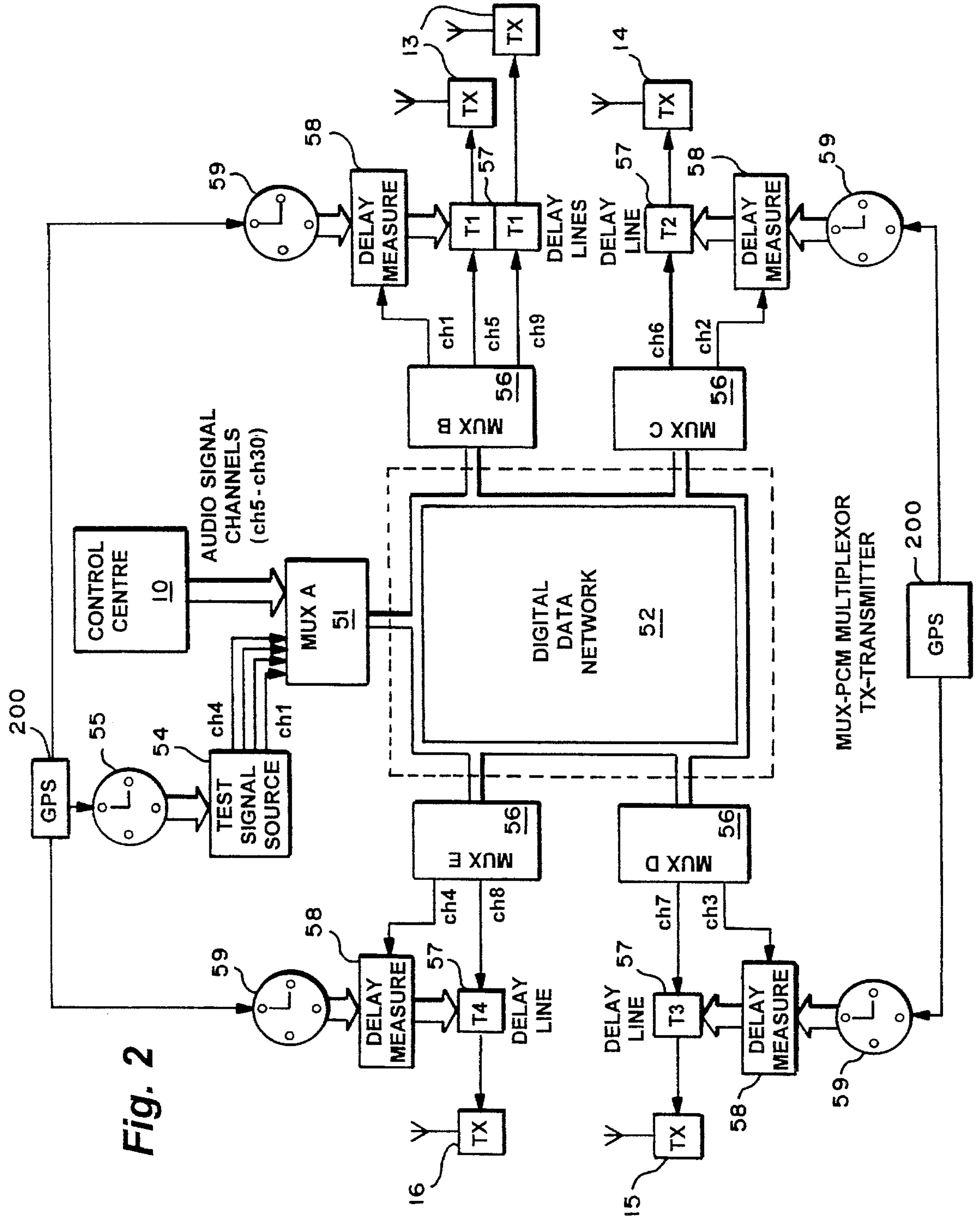
FIG. 2 is a schematic block diagram of a quasi-synchronous radio system of the preferred embodiment of the invention.

Refering to FIG. 2, the system of the preferred embodiment has a control centre 10, which is a source of and destination for signals, connected to a multiplexer A (51) and thence to a digital data network 52, shown exemplarily as a 2 Mb/s Megastream network. Also connected to the data network are further multiplexers (Mux) B, C, D and E(56) at transmitters 13, 14, 15 & 16 at various geographical locations. A test signal source 54, with associated clock 55, is also connected via the multiplexer 51 to the digital data network 52. The digital data network 52, serves four transmitters sites 53, each of which has a respective multiplexer 56, an output of which is connected to a variable delay line 57 which in turn is connected to a respective site transmitter, and a delay measuring unit 58 with associated clock 59, which unit is connected to receive an output from the respective multiplexer 56 and connected to provide a control output to the respective variable delay line 57.

The operation of the system will now be described in general terms. An analogue signal is fed over the digital network 52 to the various sites 13 to 16. These transmissions are multiplexed on the 2.048 Mbps digital data stream (ie. Megastream), which connects each multiplexer in the network. The path length between each site and the control centre will vary according to the path taken.

The preferred embodiment of the invention works to correct for these path differences, as follows. At pre-defined intervals, such as the start of every minute or every second, the test signal source 54 at the control centre 10 site applies a test signal (either analogue or digital) to the four test channels, 1–4. At each transmitter site the time of arrival of the test signal is identified, and The corresponding propagation time from the control centre is determined. Additional delays are then built into the respective signal paths at each transmitter site, such that the aggregate delay between the control centre and any transmitter is the same.

The maximum delay through digital networks is defined, and the aggregate delay would be chosen to accomodate this. Thus, for example, if the maximum delay through the data network were known to be 8 ms, an aggregate delay of 10 ms might be appropriate. Then if the delay to multiplexer 2 was 3 ms, T2 would be set as 7 ms, etc.

This measurement and compensation process would be repeated at regular intervals to accomodate any changes in propagation delay brought about by re-routing within the digital data network.

Figure 3:
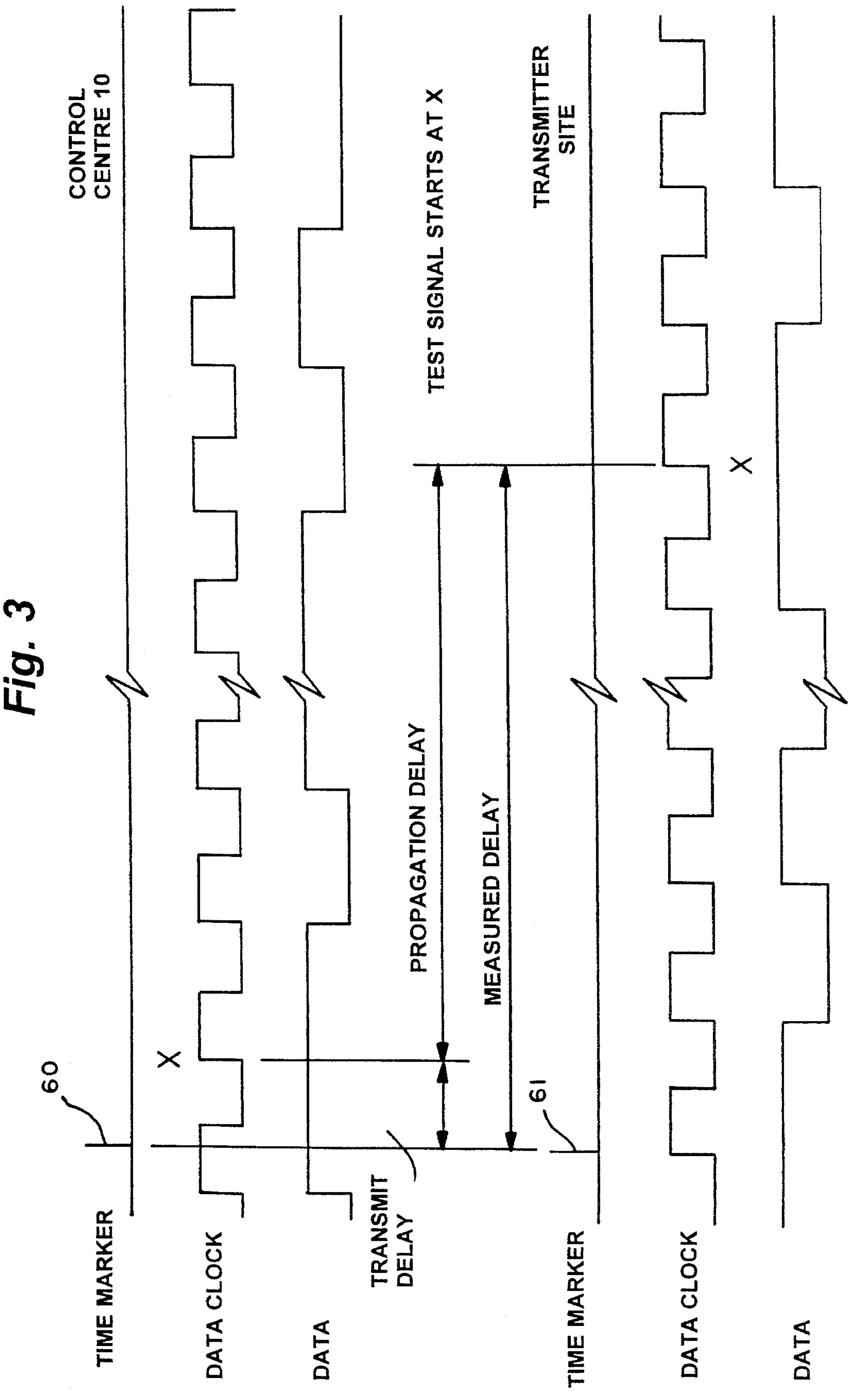
FIG. 3 is a timing diagram illustrating the operation of the system of FIG. 2.

The operation of the preferred embodiment will now be described in greater detail with reference to FIG. 3. The clock 55, associated with the control centre 10, and each of the clocks 59, at the various transmitter sites, synchronously generate a precise time marker; shown respectively as 60 and 61 in FIG. 3, at predetermined intervals, e.g. every minute or every second. The time marker is a pulse of 20 μs duration.

As soon as possible following the generation of the time marker, for example at the start of the next clock cycle, a test signal is transmitted by the test signal source 54 to each of the transmitter sites via the digital data network 52. The delay between occurrence at the control centre 10 of the time marker 60 and the start of transmission of the test signal is termed the "transmit" delay. The transmission of the test signal is followed by a transmission from the control centre to each of the transmitter sites of the length of the transmit delay. This information is transmitted by means of a data packet comprising a 16 bit header forming the test signal followed by an 8 bit field containing the value of the length of the transmit delay.

At each transmitter site at the instant local time marker 61 is generated the delay measuring unit 58 starts a timer. These timers measure the delay before the test signal arrives at each site, and this measured delay is the propagation delay of the data network plus the transmit delay as shown in FIG. 3.

In order to determine the propagation delay itself the delay measuring unit 58 awaits the transmission of the length of the transmit delay, which follows each test signal, and then subtracts this transmit delay from the measured delay.

It is important for an accurate determination of the propagation delay that the transmit delay is included in the delay calculation because the generation of the time markers is unlikely to be synchronous with the digital data network. This means that not taking the transmit delay into account could result in an error in the propagation delay of up to one bit period of the test signal channel e.g. if the test signal was transmitted via a 64 k bit/s channel this would be 15.625 μs, which is a significant error.

Having accurately measured the propagation delay of the digital data network to each transmitter site, additional delays are then inserted into each signal path by each of the delay lines 57 at the transmitter sites. These additional delays are calculated by each delay measuring unit 58 so as to give a total delay between the control centre and each transmitter of a predetermined value (this value being the same at each transmitter site) which is known to exceed the longest possible transfer delay of the network.

The additional delays inserted by the delay lines can be generated by any convenient method but are preferable generated by passing the digital voice samples carried by the data network through a shift register which operates at a constant rate, but whose length can be varied according to the delay required. Thus, for example if the shift register operated at 1 MHz, a delay of Nμs could be introduced by passing all audio signal samples through N stages of the shift register.

The described embodiment employs separate channels for user data and the test signal. Alternatively, the same channel could be used for both by using time division multiplexing of that channel. In this case the transmit delay would, Significantly, be the period between occurrence of the time marker and the time slot for the test signal.

The time markers 60, 61 can be generated by clocks 59 whose synchronism is maintained by any convenient method, but are preferable generated by clocks whose synchronism is maintained via a global positioning satellite (GPS) inputs 200.

We claim:

1. A radio system comprising:

a central source of signals for transmission;

a plurality of radio transmitters, each connected to the central source by a digital data transfer link each having a respective transfer delay;

means located at the central source for injecting into a channel of at least one of said transfer links a test signal at an intended predetermined time, means located at least one of said transmitters and coupled to its respective said at least one transfer link for determining the travel time of the test signal over that particular link by establishing the difference between arrival time of the test signal and said intended predetermined time of transmission of the test signal, means located at the said at least one transmitter and coupled to its respective said at least one said link for adjusting the transfer delay to said at least one transmitter to equalise the transfer delays to the transmitters, so that signals from the central source can be transmitted from the transmitters substantially in time synchronism, correction means located at the central source for measuring a transmit delay between said intended predetermined transmission time and the actual time of transmission of the test signal, and for sending data representing the length of the transmit delay over the said at least one transfer link, and said means for adjusting also corrects the adjustment of transfer delay by use of said received data representing the transmit delay.

2. A radio system as in claim 1, wherein the means for adjusting adjusts the delay of each of the transfer links to be at least equal to the longest transfer delay of the system.

3. A radio system as in claim 1 wherein the length of the transmit delay is measured at the control center and is transmitted to the transmitters after the test signal.

4. A quasi-synchronous bi-directional radio system for communicating with a mobile station according to claim 1 further comprising:

a control center connected to said central source for sourcing signals to, and receiving signals from, mobile stations; and a plurality of outlying transceivers for relaying the signals between the control center and the mobile stations and vice versa.

5. A radio system as in claim 1, wherein the means for adjusting adjusts the delay of each of the transfer links to be equal to a predetermined limit.

6. A radio system as in claim 5, in which the predetermined limit is greater than the longest transfer delay of the system.

7. A radio system as in claim 1 wherein the means for adjusting the delay comprises a variable length shift register.

8. A radio system as in claim 7 wherein the shift register operates at a constant rate.

9. A radio system as in claim 1 wherein each of the central source and radio transmitters has a clock for generating time markers at the intended predetermined times.

10. A radio system as in claim 9 wherein each of the clocks is maintained in synchronism with each of the other clocks via a global positioning satellite.

11. A radio system as in claim 9 wherein the means for adjusting comprises means for measuring the transmit delay between the generation of a time marker and the transmission of the test signal.

12. A method of operating a radio system in which a signal for transmission is disseminated from a central source to a plurality of transmitters at separate sites, each connected to the central source by a digital data transfer link, each link having a respective transfer delay, said method comprising the steps of:

(a) injecting into a channel of a transfer link a test signal at a intended predetermined time, (b) determining the travel time of the test signal over said link by establishing the difference between arrival time and said intended predetermined time of transmission of said test signal, (c) measuring a transmit delay between said intended predetermined transmission time and the actual time of transmission of the test signal, (d) sending data representing the length of the transmit delay over the transfer link and (e) adjusting the transfer delay to at least one of the transmitters to equalise the transfer delays to the transmitters including use of said data representing the transmit delay, so that signals from the central source are transmitted from the transmitters substantially in time synchronism.

* * * * *